United States Patent
Gorsica et al.

(10) Patent No.: US 10,812,908 B1
(45) Date of Patent: Oct. 20, 2020

(54) USER-BASED PRIVACY ACTIVATION FOR AUDIO PLAY MODE

(71) Applicant: Motorola Mobility LLC, Chicago, IL (US)

(72) Inventors: John Gorsica, Chicago, IL (US);
Thomas Merrell, Chicago, IL (US);
Jarrett Simerson, Chicago, IL (US);
Michael Russell, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/549,097

(22) Filed: Aug. 23, 2019

(51) Int. Cl.
| | |
|---|---|
| *H04R 5/04* | (2006.01) |
| *H04M 1/60* | (2006.01) |
| *G06F 3/16* | (2006.01) |
| *G06F 21/32* | (2013.01) |
| *G06F 9/54* | (2006.01) |
| *G06F 3/0488* | (2013.01) |

(52) U.S. Cl.
CPC ........... *H04R 5/04* (2013.01); *G06F 3/04883* (2013.01); *G06F 3/167* (2013.01); *G06F 9/542* (2013.01); *G06F 21/32* (2013.01); *H04M 1/6033* (2013.01); *H04R 2499/11* (2013.01)

(58) Field of Classification Search
CPC ....... H04R 5/04; H04R 2499/11; G06F 9/542; G06F 3/04883; G06F 3/167; G06F 21/32; G06F 3/0488; H04M 1/6033; H04M 1/6041
See application file for complete search history.

(56) References Cited

U.S. PATENT DOCUMENTS

| | | | | |
|---|---|---|---|---|
| 5,224,151 | A * | 6/1993 | Bowen | H04M 1/6016 340/524 |
| 2004/0067770 | A1* | 4/2004 | King | H04M 1/0245 455/557 |
| 2013/0260839 | A1* | 10/2013 | Moquin | H04M 1/605 455/569.1 |

* cited by examiner

*Primary Examiner* — Yogeshkumar Patel
(74) *Attorney, Agent, or Firm* — McKinney Phillips LLC; Phillip Pippenger

(57) ABSTRACT

A privacy system and method are provided for selecting an audio play mode in a mobile electronic communications device having a microphone, a loudspeaker and an earpiece speaker. The described technique in an embodiment includes retrieving data for replay to the user, determining based on a characteristic of the data or the user whether the data is private, and playing the retrieved data via the earpiece speaker if the data is private. Otherwise the retrieved data is played via the loud speaker.

18 Claims, 6 Drawing Sheets

USER-BASED PRIVACY ACTIVATION FOR AUDIO PLAY MODE

TECHNICAL FIELD

The present disclosure is related generally to mobile electronic communications devices and, more particularly, to systems and methods for activating and deactivating privacy behavior associated with a mobile electronic communications device.

BACKGROUND

While the cellular phone was initially created to allow voice communications, it quickly grew into a device capable of handling entertainment tasks, financial transactions, social interactions and many other activities. As users interacted more frequently with their devices, user interface modalities were continually upgraded to keep up with the changes. For example, hardware push buttons gave way to virtual buttons displayed on the screen, and now even virtual buttons may be supplanted by voice interaction routines for most purposes.

However, voice interactions do not provide an ideal user interface modality. In particular, voice interactions are hampered by a number of concerns, including privacy and convenience. For example, voice assistant devices and routines today typically use loudspeakers and far-field microphones and also often require the use of specific trigger-phrases to activate automatic speech recognition (ASR) processing.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
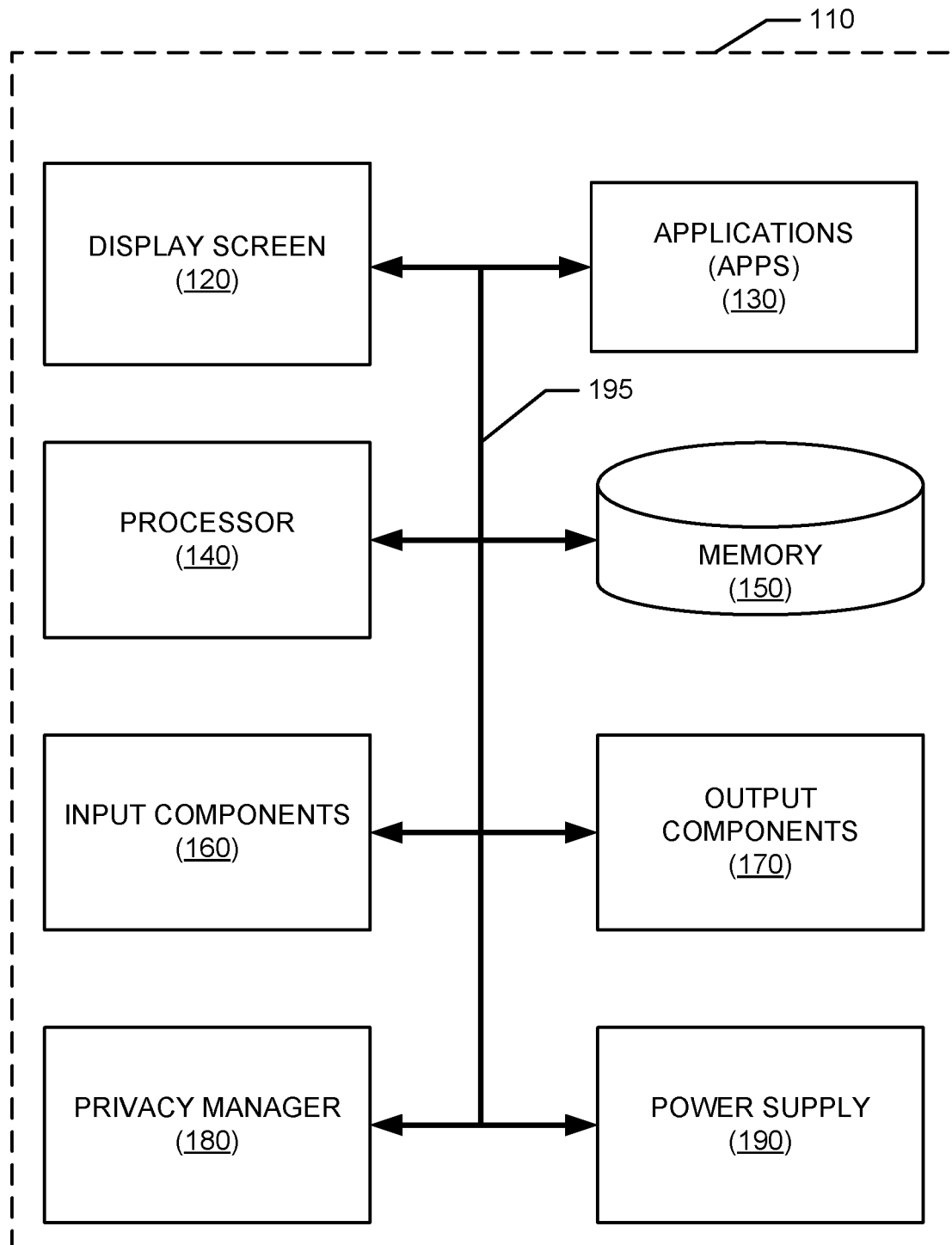
FIG. 1 is a general schematic representation of a mobile electronic device in which various embodiments of the disclosed principles may be implemented.

Before presenting a detailed discussion of embodiments of the disclosed principles, an overview of certain embodiments is given to aid the reader in understanding the later discussion. As noted above, voice interaction routines are useful for many human-device interactions. However, existing voice interaction systems suffer from privacy and usability issues, since such systems typically use loudspeakers and far-field microphones and also require the use of specific trigger-phrases for ASR processing (and any subsequent commanded actions) to occur.

In an embodiment of the disclosed principles, a mobile communications device such as a flip phone or other cellular phone employs a voice interaction adaptation strategy that serves the user's privacy interests while also allowing less constrained interaction dynamics. Thus, for example, the device detects user usage cues such as device position and configuration relative to the user as well as informational cues such as communication substance to determine which device speaker system to use as well as to determine a play volume for communications from the device to the user.

As a simplistic example, in an embodiment, a voice command issued with the phone against the user's head is presumptively private and the device may accordingly use the earpiece speaker to respond. Similarly, voice response data that is private in nature, e.g., a medical test report or bank balance report, may be only played through the earpiece speaker. Alternatively, the playback of private information may require user authentication to use the loudspeaker.

In general terms, a number of factors are used collectively, in select combinations, or individually to assess the user's privacy requirements and modify device behavior accordingly and select the proper audio playback path for voice response. Such factors include whether device is against the user's head, whether the device is flipped open (for flip-type phones) when issuing a voice assistant query, and receiving user consent prior to hearing personal information from the voice assistant.

In an embodiment, responsive behaviors include, for example, initiating a voice response on the device's earpiece speaker to provide personal information when the device is against the user's head (and otherwise using the device loudspeaker), pausing the audio response from the voice assistant when the communication is private and the device is pulled away from the user's ear (and resuming the response when the device is returned to the user's ear), switching the audio path from loudspeaker to earpiece when the phone is placed against the user's ear during assistant speech.

The device may also provide, in an embodiment, simultaneous authentication and approval of assistant speech output with a single user phrase or action. Moreover, re-authentication may be required if response speech is paused, prior to resuming on any audio path. With respect to flip-type devices, voice assistant voice output, may be ended or cancelled closing the device in an embodiment of the disclosed principles.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Thus, for example, while FIG. 1 is a simplified electrical schematic drawing illustrating components of an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, different generations of cellular service, e.g., 4G, 5G, etc.

The device 110 as illustrated also includes one or more output components 170 such as RF (radio frequency) or wired output facilities. The RF output facilities may similarly support any number of protocols, e.g., WiFi, Bluetooth, cellular including 5G, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a voice assistant 180 executes functions associated with audio output mode and volume decisions associated with private and non-private response information. In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

In an embodiment, the input 160 and output 170 components include one or more speakers, e.g., one or more earpiece speakers and one or more loudspeakers, as well as one or more microphones. It will be appreciated that these components may be built into the device 110, or alternatively, some or all may be separate from the device 110.

Figure 2:
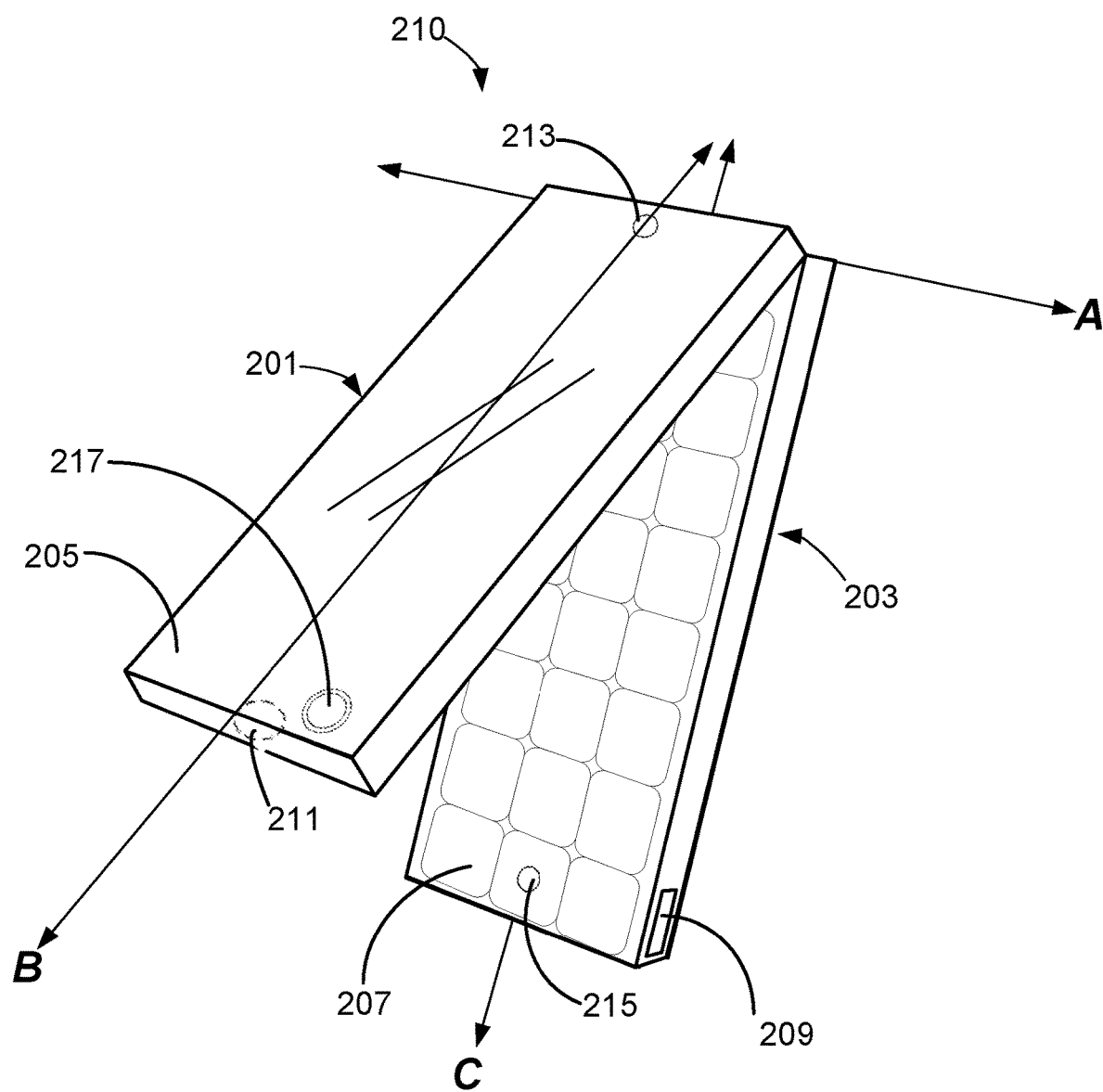
FIG. 2 is a simplified side view of a mobile electronic device such as that described with respect to FIG. 1, usable in various embodiments of the disclosed principles.

Turning to FIG. 2, this figure shows a simplified side view of a flip-type device 210 within which various embodiments of the disclosed principles may be implemented. As can be seen, the device 210 includes a first part 201 hinged to a second part 203. Although there is no requirement as to the features of each part 201, 203, in the illustrated embodiment, the first part 201 includes a display screen 205, while the second part 203 includes one or more physical keys 207. It will be appreciated that the display screen 205 of the first part 201 may also implement selectable keys, e.g., as touch sensitive displayed keys.

The device 210 as illustrated also includes a loudspeaker 209, which is a speaker configured to transmit sound audible from a distance, e.g., within several feet of the device 210. The device 210 also includes an earpiece speaker 211 which is placed so as to be adjacent to the user's ear when the device 210 is flipped open and is held to the user's head, e.g., during a phone call. The earpiece speaker 211 is configured to transmit sound that is clearly audible only from a very close range, e.g., within 12 inches.

One or more mics 213, 215 are also included, with one the mic 213 being usable while the device 210 is closed and the other mic 215 being usable while the device 210 is open. The second mic 215 is located so as to be adjacent the user's mouth when the device 210 is flipped open and is held to the user's head, e.g., during a phone call. Although not implicated in the present description, a camera 217 is also shown for reader context.

The primary longitudinal axis of the first part 201 is labelled by the identifier B while the primary longitudinal axis of the second part 203 is labelled by the identifier C. In operation of the device 210, the device 210 may be open (e.g., the first part 201 rotated until it is essentially parallel and end-to-end with the second part 203 and axes B and C are collinear) or closed (e.g., with the first part 201 closed against the second part 203 such that the keys 207, earpiece speaker 211 and mic 215 are not visible to, nor usable by, the user, and axes B and C are parallel but not collinear). In FIG. 2, the device 210 is shown partially open to illustrate the location and axis A of the hinge between parts 201 and 203.

It will be appreciated that in the open state of the device 210, the first part 201 may not be precisely parallel with the second part 203, e.g., the first and second parts 201, 203 may meet at substantially more than or less than 180°. As such, the open state of the device 210 may be understood as the state in which the device cannot open substantially further without damage or strain. Similarly, in the closed state, whether or not the parts 201, 203 are precisely parallel, the device 210 cannot be closed substantially further without damage or strain.

Figure 3:
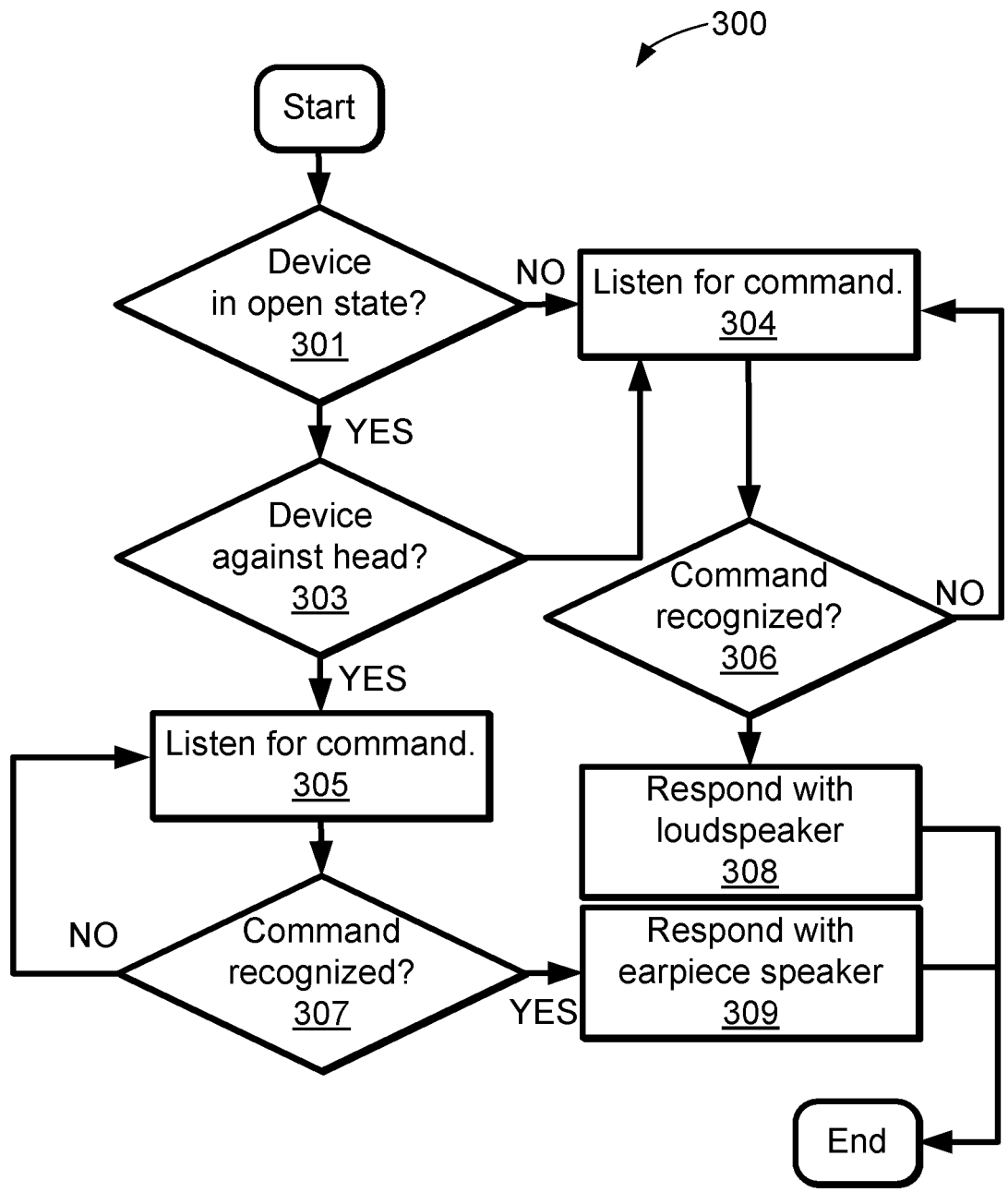
FIG. 3 is a flow chart showing a process of privacy activation in accordance with an embodiment of the disclosed principles.
Figure 4:
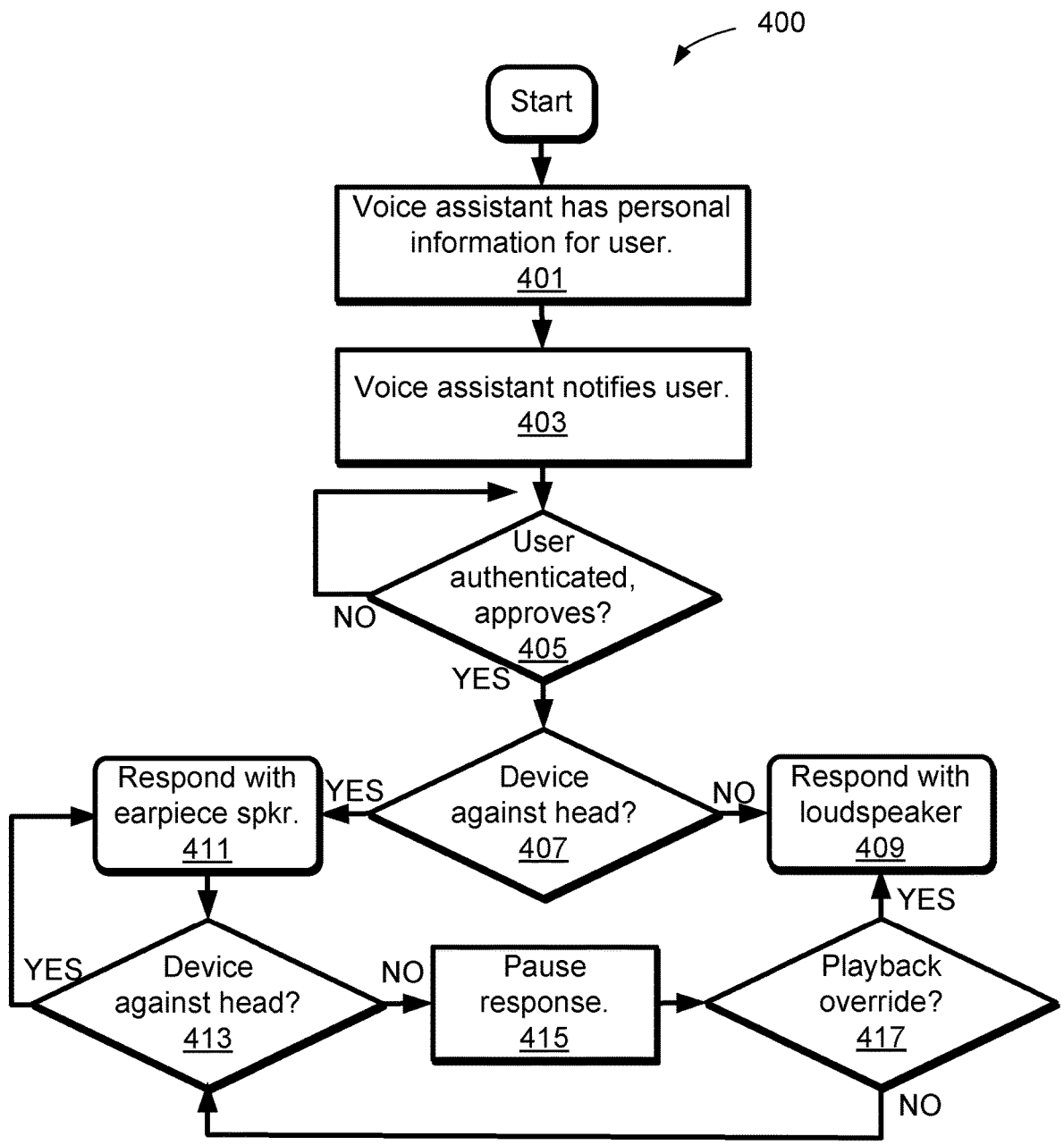
FIG. 4 is a flow chart showing a process of privacy activation in accordance with a further embodiment of the disclosed principles.

FIGS. 3 and 4 include flowcharts showing methods of processing user context cues to determine an audio path to play potentially private information, e.g., during a voice assistant response to a user query or command. Referring first to FIG. 3, the illustrated process 300 employs contextual cues from the user's manipulation of the device 210 to determine an audio path—public or private—for the playing of a voice assistant response to the user. Thus at stage 301, the device 210 determines whether it is in the open state, and if so, determines at stage 303 whether it is placed against the user's head, e.g., for listening.

If the device 210 is against the user's head, the device 210 listens at stage 305 for a user request or command, such as a request to check a bank balance or to read a text aloud. If such a request or command is detected and recognized at stage 307, the process 300 moves forward to stage 309, but otherwise loops back to stage 305 to continue listening. At stage 309, the device 210 plays the appropriate response via the earpiece speaker 211 of the device. This ensures privacy of information requested in a presumptively private context.

However, the result differs if the request was not made in a private manner. Thus, for example, if the device 210 is determined to be either not open at stage 301 or not against the user's head at stage 303, then the process moves to stage 304, wherein it again listens for a command or request. However, when such a command or request is made and recognized at stage 306, the device 210 plays the appropriate response via the loud speaker 209 of the device 210 at stage 308. In this way, when privacy is not required, e.g., for non-private information, as determined by the request being made in a presumptively non-private context, the information can be played in a manner that is convenient for the user.

In an embodiment of the disclosed principles, a voice assistant response may be interrupted by a change in the device context. An example of the handling of such an interruption is shown in the process 400 of FIG. 4. At stage 401 of the process 400, the voice assistant process of the device 210 has information of a private nature to play to the user. The information may have been identified as private by the user or, alternatively, the voice assistant may have flagged the information as private based on the nature of the information itself. For example some types of information, e.g., personally identifying information (social security number, birth date, etc.), business confidential information (financial data, bank records, legal memoranda) or medical information may be deemed private by default. Moreover, the private information may be the result of a user query or may be independent of user action, e.g., an incoming text or message.

At stage 403, the voice assistant notifies the user that it has information of a private nature to play to the user and requests or waits for user approval for the audio response. This notification may be made by any suitable method, e.g., issuance of a tone or alarm, issuance of a spoken notification, issuance of a tactile notification such as a vibration, or issuance of a visual alert, e.g., on the device screen or via an alert light on the device 210.

If the user approves at stage 405, and the device 210 is determined to be against the user's head at stage 407, then the device 210 responds through the device earpiece speaker 211 at stage 411. User approval may be given by voice authentication with voice approval or via fingerprint authentication for example. If instead the device 210 is determined at stage 407 to be not against the user's head, then the process 400 moves from stage 407 to stage 409, wherein it plays the information through the device loud speaker 209.

Whether or not the device is against the user's head may be determined by any of various methods. Suitable example methods include proximity detection at the earpiece or microphone, breath detection, thermal detection, radar detection, ultrasonic detection and so on.

When the device 210 is playing the information via the earpiece speaker 211 at stage 411, it checks periodically at stage 413 that the device 210 is still against the user's head. If the device 210 remains against the user's head, the device 210 continues play through the earpiece speaker 211 at stage 411. However, if at stage 413 the device 210 is determined to no longer be against the user's head, then the process moves to stage 415, wherein the playback is paused. Moving then to stage 417, if the user indicates an override of the privacy mode, e.g., by selecting a play icon or giving an utterance such as "continue," then the process 400 moves to stage 409, wherein the device 210 continues the playback over the device's loud speaker 209 rather than its earpiece speaker 211.

In an embodiment, processing of the "continue" command includes voice authentication processing of the utterance. In another embodiment, use of the "continue" command or the like is comprised of, or is accompanied by, a separate user authorization, e.g., via a fingerprint sensor, secondary voice authentication and so on.

Figure 5:
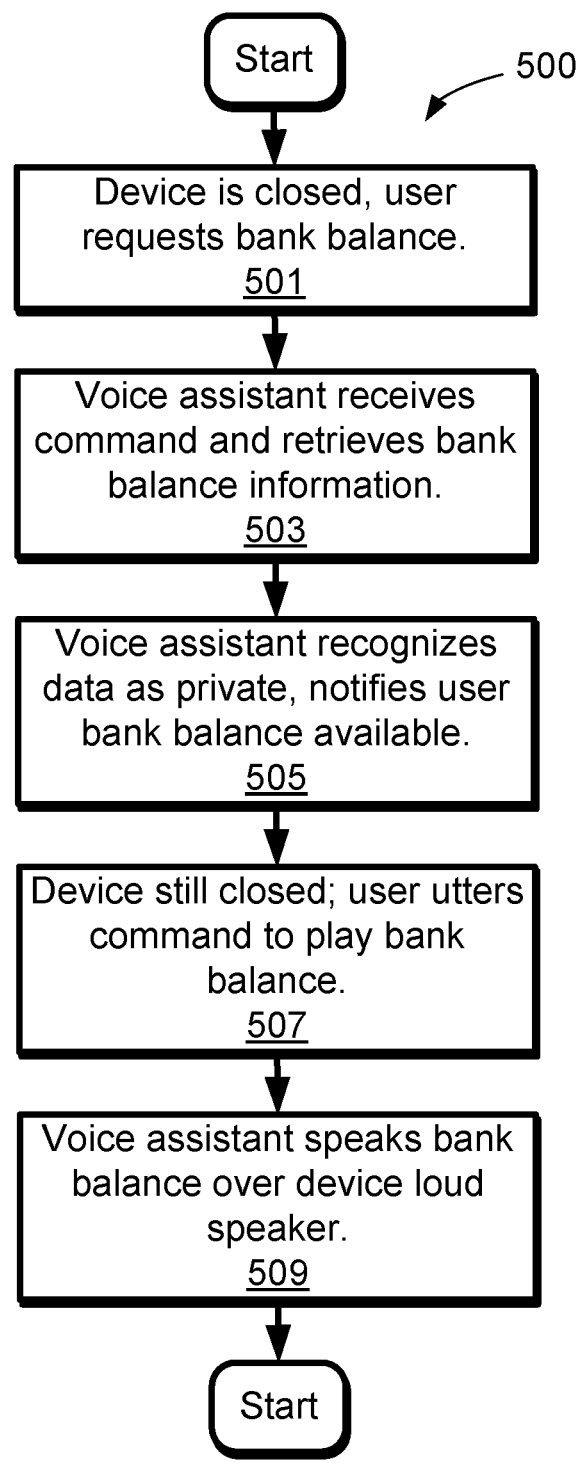
FIG. 5 is a flow chart showing a example of privacy activation in accordance with an embodiment of the disclosed principles.
Figure 6:
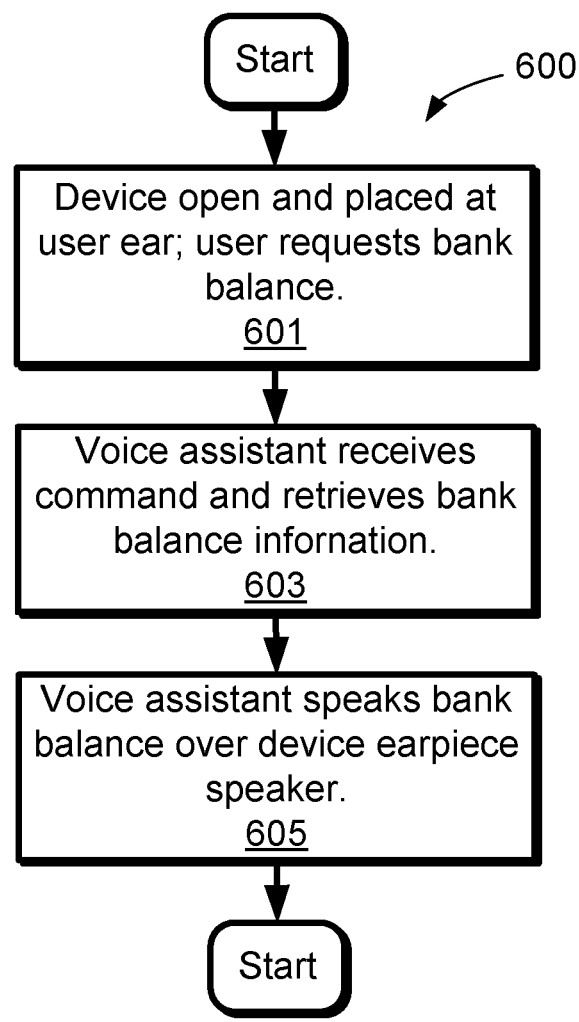
FIG. 6 is a flow chart showing an example of privacy activation in accordance with a further embodiment of the disclosed principles.

Combining some of the foregoing embodiments of the disclosed principles into concrete examples, FIGS. 5 and 6 show sample process flows taken in specific situations. It should be appreciated that the illustrated situations are given for the sake of example and are not to be taken as limiting the scope of the disclosed principles in any way.

FIG. 5 shows a series of actions taken by the device in the context of and in response to a user command to obtain and convey a bank balance. Initially at stage 501 of the process 500, with the device closed, the user utters a request to the voice assistant for their bank balance information. The voice assistant receives the command and retrieves the bank balance information at stage 503. However, recognizing the data as a type of private data, the voice assistant notifies the user that bank balance available at stage 505 instead of simply voicing the data aloud. With the device still closed at stage 507, the user utters a command for the voice assistant to play the bank balance anyway. Thus at stage 509, the voice assistant speaks the bank balance over the loud speaker of the device.

A similar situation is illustrated in the process 600 of FIG. 6. In this case, with the phone open and placed up to his or her ear, the user requests their bank balance of the voice assistant at stage 601. At stage 603, the voice assistant receives and interprets the command, and retrieves the user's bank account balance information. Upon obtaining the requested information, the voice assistant plays the bank balance information over the device earpiece speaker at stage 605.

If, in the situation of FIG. 6, the user were to instead remove the device from their ear during playback of the bank balance data, the voice assistant may interrupt the playback, as in the process 500 of FIG. 5, to await confirmation from the user.

As noted above, the replay of information may be based on the nature of the data and user as well as or alternatively to, the state of the device. Thus, for example, the replay process may include retrieving data for replay to the user and previously, contemporaneously or subsequently determining based on a characteristic of the data or the user whether the data is private. The retrieved data is then played via the earpiece speaker if the data is private, and is otherwise played, if at all, via the loud speaker.

The retrieval may be prompted by a user voice request for data via the microphone, and playing of the retrieved data via the earpiece speaker may be interrupted when the user moves the device away from his or her head (such that it is no longer adjacent the user's head). The determination of whether the device is adjacent the user's head may be based upon whether the device is within a predetermined earpiece speaker range of the user's head for example.

After playing of the retrieved data via the earpiece speaker is interrupted, the device may finish playing the material via the earpiece speaker when the user moves the device such that it is again adjacent the user's head or may finish playing the material via the loud speaker upon receipt of a user command to continue. The user command to continue may be an utterance received via the microphone, an action received via the touch sensitive screen, or user selection of a user-selectable button on the device.

If the data is private and the user actions indicate that play back will not be private, e.g., because the device is not with earpiece speaker range of the user's head, then prompting the user for instructions may include performing a fingerprint or voice authentication and playing the received data via the loudspeaker contingent upon the authentication.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile electronic communications device for implementing a user-based privacy activation for audio play mode, the device comprising:
at least one microphone;
a loudspeaker configured to project sound that is audible to a user when the user's ear is not adjacent the loudspeaker;
an earpiece speaker configured to project sound that is audible only when the user's ear is adjacent the earpiece speaker; and
a processor linked to the microphone, the loud speaker and the earpiece speaker, configured to retrieve data for replay to the user, to determine based on a characteristic of at least one of the data and the user whether the data is private, and to play the retrieved data via the earpiece speaker if the data is private and to otherwise play the retrieved data via the loud speaker, wherein the processor is further configured to interrupt playing the retrieved data via the earpiece speaker when the user moves the device such that it is no longer adjacent the user's head.

2. The mobile electronic communications device in accordance with claim 1, wherein the processor is configured to receive a user voice request for data via the microphone and to retrieve the data for replay to the user based on the received user voice request.

3. The mobile electronic communications device in accordance with claim 1, wherein the processor is further configured to, after interrupting playing of the retrieved data via the earpiece speaker, finish playing the retrieved data via the earpiece speaker when the user moves the device such that it is again adjacent the user's head.

4. The mobile electronic communications device in accordance with claim 1, wherein the processor is further configured to, after interrupting playing of the retrieved data via the earpiece speaker, finish playing the retrieved data via the loud speaker rather than the earpiece speaker upon receipt of a user command to continue.

5. The mobile electronic communications device in accordance with claim 4, wherein the user command to continue is received via the microphone.

6. The mobile electronic communications device in accordance with claim 4, further comprising a touch sensitive screen linked to the processor, and wherein the user command to continue is received via the touch sensitive screen.

7. The mobile electronic communications device in accordance with claim 4, further comprising a user-selectable button linked to the processor, and wherein the user command to continue is received via the user-selectable button.

8. A method of user-based privacy activation for audio play mode in a mobile electronic communications device having a microphone, a loudspeaker configured to project sound that is audible to a user when the user's ear is not adjacent the loudspeaker and an earpiece speaker configured to project sound that is audible to the user only when the user's ear is adjacent the earpiece speaker, the method comprising:
retrieving data for replay to the user;
determining based on a characteristic of at least one of the data and the user whether the data is private;
playing the retrieved data via the earpiece speaker if the data is private and otherwise playing the retrieved data via the loud speaker; and
interrupting playing the retrieved data via the earpiece speaker when the device is adjacent the user's head and is then moved such that it is no longer adjacent the user's head.

9. The method in accordance with claim 8, further comprising receiving a user voice request for data via the microphone and wherein retrieving the data for replay to the user is based on the received user voice request.

10. The method in accordance with claim 8, further comprising, after interrupting playing of the retrieved data via the earpiece speaker, finishing playing the retrieved data via the earpiece speaker when the user moves the device such that it is again adjacent the user's head.

11. The method in accordance with claim 8, further comprising, after interrupting playing of the retrieved data via the earpiece speaker, receiving a user command continue, and finishing playing the retrieved data via the loud speaker rather than the earpiece speaker upon receipt of user command to continue.

12. The method in accordance with claim 11, wherein receiving a user command to continue comprises receiving the user command to continue via the microphone.

13. The method in accordance with claim 11, wherein receiving the user command to continue comprises receiving the user command to continue via a touch sensitive screen on the device.

14. The method in accordance with claim 11, wherein receiving the user command to continue comprises receiving the user command to continue via a user-selectable button on the device.

15. A method of selecting an audio play mode for a mobile electronic communications device having a microphone, a loudspeaker and an earpiece speaker, the method comprising:

retrieving data for replay to the user;
determining based on a characteristic of at least one of the data and the user whether the data is private; and
playing the received data via the earpiece speaker if the data is private and the device is adjacent the user's head, prompting the user for instructions if the data is private and the device is not adjacent the user's head, and otherwise playing the received data via the loud speaker, wherein playing the received data via the earpiece speaker comprises playing the received data via the earpiece speaker until the earpiece speaker is no longer adjacent the user's head, and thereafter pausing the play of the received data.

16. The method in accordance with claim 15, further comprising resuming play of the received data via the earpiece speaker, after pausing play, when the earpiece speaker is again adjacent the user's head.

17. The method in accordance with claim 15, wherein prompting the user for instructions further comprises receiving a user utterance, authenticating the user based on the user utterance, and playing the received data via the loudspeaker based on the user utterance.

18. The method in accordance with claim 17, wherein prompting the user for instructions further comprises performing a fingerprint authentication and playing the received data via the loudspeaker based on the fingerprint authentication.

* * * * *